(12) United States Patent
Hashimoto et al.

(10) Patent No.: US 10,988,147 B2
(45) Date of Patent: Apr. 27, 2021

(54) INDEPENDENT WHEEL DRIVE DEVICE AND VEHICLE

(71) Applicant: MITSUBISHI ELECTRIC CORPORATION, Tokyo (JP)

(72) Inventors: Michinori Hashimoto, Tokyo (JP); Hideo Terasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 282 days.

(21) Appl. No.: 16/087,689

(22) PCT Filed: Mar. 29, 2016

(86) PCT No.: PCT/JP2016/060050
§ 371 (c)(1),
(2) Date: Sep. 24, 2018

(87) PCT Pub. No.: WO2017/168547
PCT Pub. Date: Oct. 5, 2017

(65) Prior Publication Data
US 2019/0106126 A1 Apr. 11, 2019

(51) Int. Cl.
*B61C 9/46* (2006.01)
*F16H 1/28* (2006.01)
(Continued)

(52) U.S. Cl.
CPC ............... *B61C 9/46* (2013.01); *F16C 19/10* (2013.01); *F16C 19/26* (2013.01); *F16H 1/28* (2013.01);
(Continued)

(58) Field of Classification Search
None
See application file for complete search history.

(56) References Cited

U.S. PATENT DOCUMENTS 2,258,328 A * 10/1941 Lee ...................... B60K 17/145
180/253
3,812,928 A * 5/1974 Rockwell ............. B60K 17/046
180/65.51
(Continued)

FOREIGN PATENT DOCUMENTS

JP H06-504502 A 5/1994
JP H08-042672 A 2/1996
(Continued)

OTHER PUBLICATIONS

International Search Report (PCT/ISA/210) dated May 17, 2016, by the Japan Patent Office as the International Searching Authority for International Application No. PCT/JP2016/060050.
(Continued)

*Primary Examiner* — Mark T Le
(74) *Attorney, Agent, or Firm* — Buchanan Ingersoll & Rooney PC

(57) ABSTRACT

A planetary gear device includes a bearing inner cylinder including an internal gear on the inner circumferential side, a bearing fitted on the outer circumference of the bearing inner cylinder, an output shaft outer cylinder fitted on the outer circumference of the bearing, and an output shaft end plate that fixedly supports the planetary carrier and transmits a rotation thereof to the output shaft outer cylinder. A wheel is fitted onto the outer circumference of the output shaft outer cylinder so as to prevent relative rotation. The bearing inner cylinder is fixed to a support frame. A drive motor is fixed coaxially with the planetary gear device on the side of the support frame opposite to the bearing inner cylinder, and a rotation shaft is coupled to the sun gear.

12 Claims, 11 Drawing Sheets

(51) Int. Cl.
*F16C 19/10* (2006.01)
*F16C 19/26* (2006.01)
*F16H 57/04* (2010.01)
*F16H 57/08* (2006.01)

(52) U.S. Cl.
CPC ..... *F16H 57/0463* (2013.01); *F16H 57/0471* (2013.01); *F16H 57/0486* (2013.01); *F16H 57/08* (2013.01); *F16C 2361/61* (2013.01)

(56) References Cited

U.S. PATENT DOCUMENTS

| | | | | |
|---|---|---|---|---|
| 5,014,800 A | * | 5/1991 | Kawamoto | B60L 1/003 180/65.51 |
| 5,087,229 A | * | 2/1992 | Hewko | B60K 7/0007 180/65.51 |
| 7,530,416 B2 | * | 5/2009 | Suzuki | F16C 19/55 180/65.51 |
| 9,528,608 B2 | * | 12/2016 | Elbacher | F16J 15/4474 |
| 2008/0078647 A1 | * | 4/2008 | Watanabe | F16D 41/064 192/41 A |
| 2018/0361849 A1 | * | 12/2018 | Honkanen | F16C 19/166 |

FOREIGN PATENT DOCUMENTS

| | | |
|---|---|---|
| JP | H08-150928 A | 6/1996 |
| JP | H08-244604 A | 9/1996 |
| JP | 2000-309268 A | 11/2000 |

OTHER PUBLICATIONS

Written Opinion (PCT/ISA/237) dated May 17, 2016, by the Japan Patent Office as the International Searching Authority for International Application No. PCT/JP2016/060050.

* cited by examiner

INDEPENDENT WHEEL DRIVE DEVICE AND VEHICLE

TECHNICAL FIELD

The present disclosure relates to an independent wheel drive device for driving a wheel having no axle that connects right and left wheels used for a railway vehicle.

BACKGROUND ART

Many railway vehicles include a bogie in which two of an integrated axle having wheels fitted on both sides of the axle are arranged at the front and rear in the traveling direction of the vehicle, and the bogie is supported by a bogie frame. A railway vehicle includes a vehicle body mounted on two bogies arranged at the front and rear in the traveling direction of the vehicle. A motor and a drive device are disposed in the bogie, and the vehicle is driven by rotationally driving the axle.

In recent years, a low-floor lightweight vehicle is used as urban transportation. A mechanism for independently supporting the right and left wheels is adopted to eliminate the axle on which the right and left wheels are mounted in order to lower the vehicle floor. In this mechanism, since the right and left wheels are not connected by the axle, the right and left wheels are configured to rotate independently. Driving of the wheels is performed by the separate right and left motors, and a planetary gear device is used that is small-sized and can increase the speed reduction ratio.

For example, Patent Literature 1 discloses a single wheel travel device of a railway vehicle including a travel device frame mounted to a vehicle body via a connecting rod; a single wheel rotatably supported by an axle box of the travel device frame around a main shaft in a horizontal direction; and an air spring as a shock absorbing device for suspending the vehicle body on the travel device frame. In the single wheel travel device disclosed in Patent Literature 1, a disc brake, an axle box including a drive motor, a wheel and a gear device are arranged in this order on the rotation shaft of the wheel.

In an independent wheel drive component of Patent Literature 2, a rotational force of a motor is decelerated by a planetary reduction gears and transmitted to wheels via a transmission member. Penetrating holes are formed in the wheel, and a pin member of the transmitting member penetrates the penetrating hole, and a ring-like vibration insulation member is interposed between the penetrating hole and the pin member. The rotational force from the motor compresses the vibration insulation member and then is transmitted to the wheel. In the independent wheel drive component of Patent Literature 2, the motor, the planetary reduction gears, and the wheel are arranged in this given order on the rotation shaft of the wheel, and the planetary reduction gears is supported by the bogie frame.

CITATION LIST

Patent Literature

Patent Literature 1: National Patent Publication No. H6-504502

Patent Literature 2: Unexamined Japanese Patent Application Kokai Publication No. 2000-309268

SUMMARY OF INVENTION

Technical Problem

In a single wheel travel device disclosed in Patent Literature 1, a drive motor is disposed inside an axle box supported by a travel device frame. In the single wheel travel device disclosed in Patent Literature 1, the drive motor has a small diameter. Thus, there is an importance in securing an axial length for securing a necessary volume. In the independent wheel drive component of Patent Literature 2, the drive motor is on the outside of the wheel and is supported by the bogie frame. In the independent wheel drive component of Patent Literature 2, the drive device is arranged outside the wheel. Thus, the axial length of the drive device including the wheel is large. Therefore, there are problems of requiring a large space on the exterior of the left and right wheels, and it is probable to have difficulties in configuring the drive device in a case in which the space outside the wheels is narrow for a low-floor vehicle and the like whose vehicle body width is relatively narrow.

In order to solve the above-mentioned problems, an objective of the present disclosure is to reduce the length of the entire driving device including a motor and a planetary reduction gears in the wheel rotation shaft direction.

Solution to Problem

An independent wheel drive device according to the present disclosure includes:
a planetary gear device;
a wheel to be fitted on the outer circumference of the output shaft outer cylinder that includes a radial direction outermost circumference of the planetary gear device in a relative rotation preventing manner;
a support frame to fixedly support an input shaft side end on one side of the axial direction of the planetary gear device and to support a vehicle body via a suspension system; and
a drive motor to be fixed to the support frame coaxially with the planetary gear device on the opposite side of the planetary gear device of the support frame.

The planetary gear device includes: a bearing inner cylinder including an internal gear on an inner circumferential side; a planetary gear engaging with the internal gear; a sun gear positioned at the center of the internal gear and engaging with the planetary gear; a planetary carrier rotatably supporting the planetary gear in a state in which the planetary gear engages with the internal gear and the sun gear; a bearing coaxially fitting in the outer circumference of the bearing inner cylinder; an output shaft outer cylinder coaxially fitting in the outer circumference of the bearing; and an output shaft end plate to transmit the rotation of the planetary carrier to the output shaft outer cylinder, wherein the sun gear is an input shaft and the output shaft outer cylinder is an output shaft.

Advantageous Effects of Invention

In an independent wheel drive device of the present disclosure, a planetary gear device is disposed on the inner circumferential side of a wheel and the planetary gear device and a drive motor are fixed to a support frame. Thus, the length of the entire drive device including the wheels can be decreased in the wheel rotation shaft direction.

DESCRIPTION OF EMBODIMENTS

Figure 1:
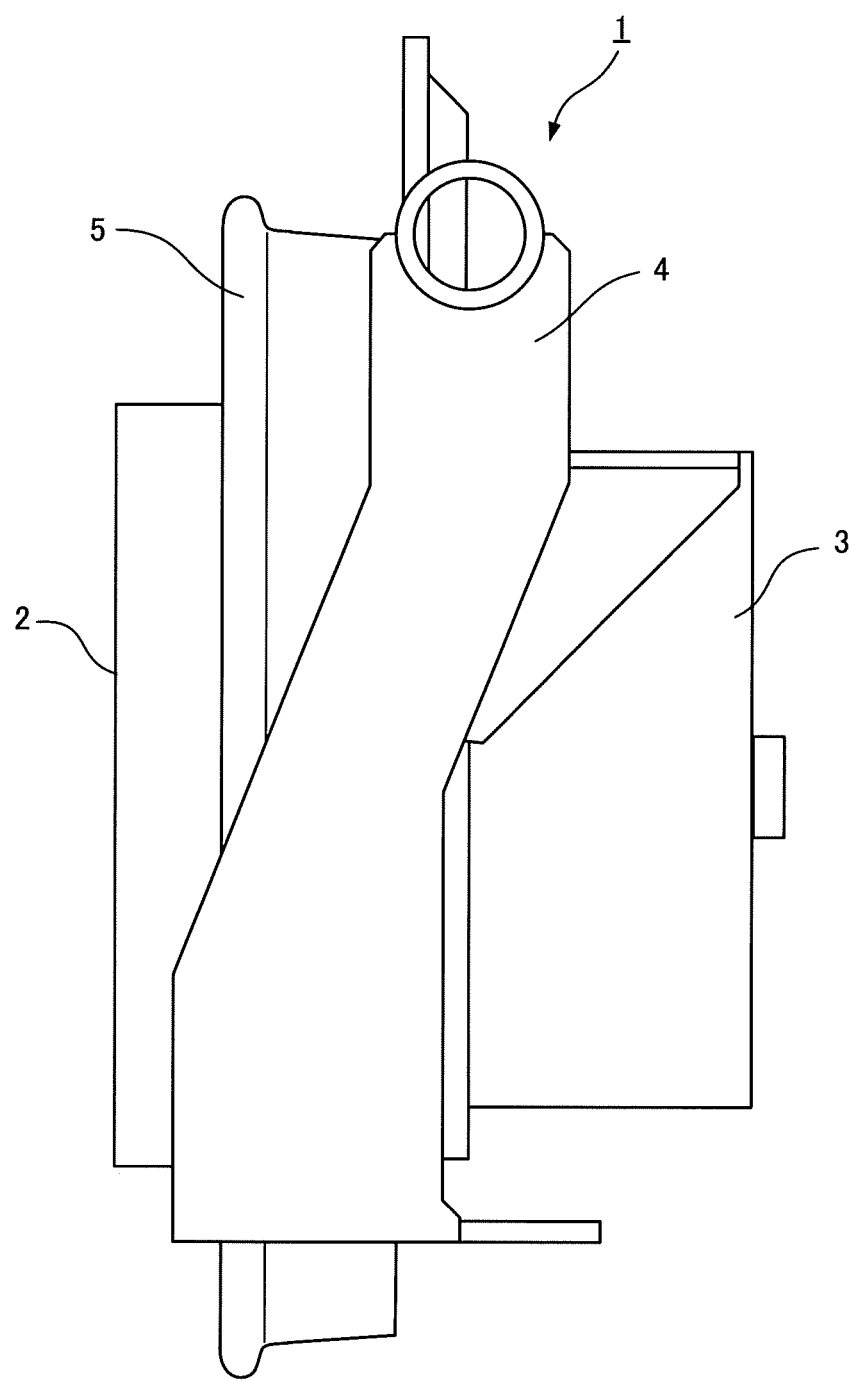
FIG. 1 is a diagram showing an entire independent wheel drive device according to Embodiment 1 of the present disclosure.

Hereinafter, embodiments of the present disclosure are described in detail with reference to the drawings. Identical or equivalent parts are denoted by the same reference signs in the drawings. In order to avoid complication of the figures and to facilitate understanding, there are cases in which bolts, nuts, holes through which the bolts are passed, and the like are omitted from the figures.

Embodiment 1

FIG. 1 is a diagram showing an entire independent wheel drive device according to Embodiment 1 of the present disclosure. An independent wheel drive device 1 includes a planetary gear device 2, a drive motor 3, and a support frame 4. The planetary gear device 2 and the drive motor 3 are fixed to the support frame 4. A wheel 5 is fitted on the output shaft outer cylinder of the planetary gear device 2 so as to prevent relative rotation. Therefore, the support frame 4 rotatably supports the wheel 5. The rotation of the rotation shaft of the drive motor 3 is decelerated by the planetary gear device 2 and transmitted to the wheel 5.

Figure 2:
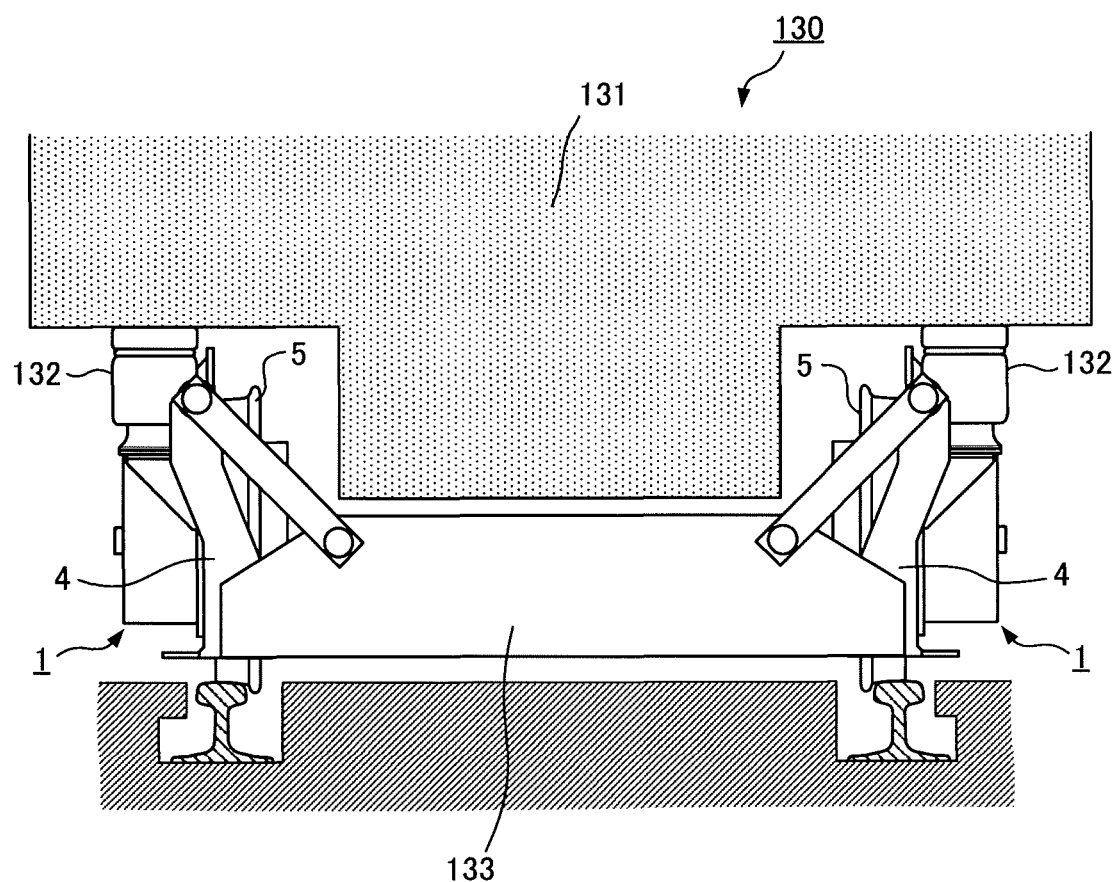
FIG. 2 is a diagram showing an example of a vehicle including the independent wheel drive device according to Embodiment 1.

The independent wheel drive device 1 according to Embodiment 1 of the present disclosure is used for a vehicle traveling on a track including two rails laid in parallel. FIG. 2 is a diagram showing an example of a vehicle including the independent wheel drive device according to Embodiment 1. Here, the track is defined as follows. The plane in contact with the upper surface of the two rails is referred to as a track surface. The direction orthogonal to the track surface is referred to as a vertical direction. A direction parallel to a traveling direction of the vehicle traveling on the track is referred to as a front-rear direction. A direction parallel to the track surface and orthogonal to the traveling direction of the vehicle is referred to as the lateral direction.

A vehicle 130 in FIG. 2 runs on a track including two rails. The vehicle 130 includes two units of the independent wheel drive devices 1 shown in FIG. 1 facing each other on the left and right. A vehicle body 131 of the vehicle 130 is supported by the support frame 4 of the independent wheel drive device 1 via a suspension system 132. The wheels 5 are supported so as to be able to roll on the rails. In the two opposed independent wheel drive devices 1, the support frames 4 are connected to each other by, for example, two frames 133 fixed to the front and rear sides of the support frame 4. A structure for connecting the support frames 4 to each other is not limited to the frame 133 in FIG. 2. In FIG. 2, a mechanism for transmitting a force in the front-rear direction (the direction orthogonal to the plane of the drawing paper of FIG. 2) between the independent wheel drive device 1 and the vehicle body 131 is omitted. For example, the force in the front-rear direction can be transmitted between the independent wheel drive device 1 and the vehicle body 131 by using a traction link that is rotatably coupled to the support frame 4 and the vehicle body 131, respectively, around the axes in the lateral direction.

Figure 3:
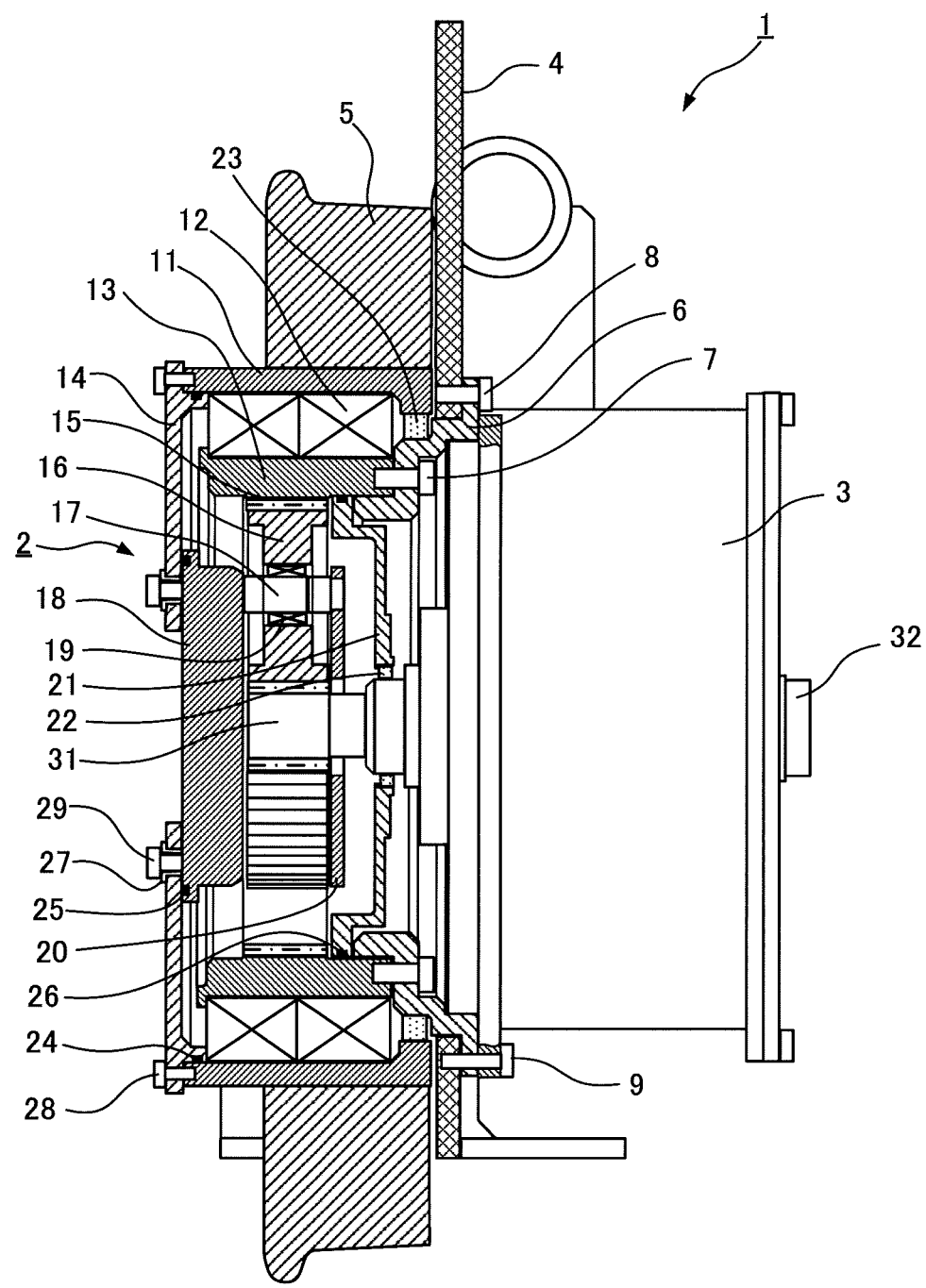
FIG. 3 is a cross-sectional view showing an internal configuration of the independent wheel drive device according to Embodiment 1.

FIG. 3 is a cross-sectional view showing an internal configuration of the independent wheel drive device according to Embodiment 1. In FIG. 3, the cross section of the drive motor 3 is not shown. The planetary gear device 2 includes an internal gear 15, a planetary gear 16 engaging the internal gear 15, a sun gear 31 engaging the planetary gear 16, a planetary carrier 18, a bearing inner cylinder 13 including the internal gear 15 on the inner circumferential side, a bearing 12 coaxially fitted on the outer circumference of the bearing inner cylinder 13, an output shaft outer cylinder 11 coaxially fitted on the outer circumference of the bearing 12, and an output shaft end plate 14 fixing the planetary carrier 18 and supported by the output shaft outer cylinder 11. The planetary gear 16 is rotatably supported around a planetary gear shaft 17 that is fixed to the planetary carrier 18 via a bearing 19. An end portion of the planetary gear shaft 17 on the side opposite to the planetary carrier 18 is supported by a planetary shaft supporting disc 20. The planetary carrier 18 rotatably supports the planetary gear 16 in a state in which the planetary gear 16 engages with the internal gear 15 and the sun gear 31.

The bearing inner cylinder 13 of the planetary gear device 2 is fixed to a fixation ring 6 using a bolt 7. The fixation ring 6 is fixed to the support frame 4 using a bolt 8.

The bearing 12 is coaxially fitted on the outer circumference of the bearing inner cylinder 13 of the planetary gear device 2. For example, the bearing 12 is a cylindrical roller bearing that supports a radial load or is a deep groove ball bearing that can support an axial load. The output shaft outer cylinder 11 is coaxially fitted on the outer circumference of the bearing 12. The wheel 5 is fitted on the outer circumference of the output shaft outer cylinder 11 coaxially with the planetary gear device 2 in a relative rotation preventing manner. The wheel 5 is rotatably supported via the bearing 12 and the output shaft outer cylinder 11.

The planetary carrier 18 of the planetary gear device 2 is fixed to the output shaft end plate 14 by a bolt 29 with a torque transmission ring 27 inserted around the bolt 29. The output shaft end plate 14 is fixed to the output shaft outer cylinder 11 using bolts 28 on the outer circumferential side thereof. The output shaft end plate 14 is a transmission member that fixedly supports the planetary carrier 18 and transmits the rotation to the output shaft outer cylinder 11.

The drive motor 3 is fixed using a bolt 9 onto the opposite side of the support frame 4 of the planetary gear device 2. A rotation shaft 32 of the drive motor 3 is coupled to the sun gear 31 of the planetary gear device 2. When the rotation shaft 32 of the drive motor 3 rotates, the sun gear 31 rotates and rolls the planetary gear 16 in a state in which the planetary gear 16 engages with the inner circumference of the internal gear 15. Since the internal gear 15 is included on the inner circumferential side of the bearing inner cylinder 13 that is fixed to the support frame 4, when the planetary gear 16 rolls in a state of engaging with the inner circumference of the internal gear 15, the planetary gear 16 revolves around the sun gear 31 while rotating. Since the planetary gear shaft 17 rotatably supporting the planetary gear 16 is fixed to the planetary carrier 18, the planetary carrier 18 rotates in the same direction as the rotation of the rotation shaft 32 of the drive motor 3. As described above, the rotation of the planetary carrier 18 is transmitted to the output shaft outer cylinder 11 by the output shaft end plate 14, and, in turn, the wheel 5, being fitted on the output shaft outer cylinder 11 in a relative rotation preventing manner, rotates.

Inside the planetary gear device 2, the sun gear 31 and the planetary gear 16 engage with each other, and the planetary gear 16 and the internal gear 15 engage with each other. In addition, the bearing 19 rotatably supports the planetary gear 16 around the planetary gear shaft 17. Further, the bearing 12 for rotatably supporting the output shaft outer cylinder 11 is disposed. Lubrication using lubrication oil is required to facilitate the engagement of these gears and the rotation support of the bearings 12 and 19, and appropriate lubrication oils are lubricated respectively.

In order to prevent the lubrication oil lubricated inside the planetary gear device 2 from leaking to the outside, various seal members are used for the parts fastening portion. On the support frame 4 side of the planetary gear device 2, a seal disc 21 is disposed between the bearing inner cylinder 13 and the rotation shaft 32 of the drive motor 3. The bearing inner cylinder 13 and the seal disc 21 do not rotate relative to each other, and an O-ring 26 is interposed between the bearing inner cylinder 13 and the seal disc 21 to seal a gap. Since the seal disc 21 and the rotation shaft 32 rotate relative to each other, an oil seal 22 is provided between the seal disc 21 and the rotation shaft 32.

Since the output shaft end plate 14 and the planetary carrier 18 are fastened by bolts 29 on the side opposite to the support frame 4 of the planetary gear device 2, an O-ring 25 is used between the output shaft end plate 14 and the planetary carrier 18. Since the output shaft outer cylinder 11 and the output shaft end plate 14 are fastened by the bolts 28, an O-ring 24 is used. Since the output shaft outer cylinder 11 and the fixation ring 6 are relatively moved by the rotation of the output shaft outer cylinder 11, an oil seal 23 is used.

Figure 4:
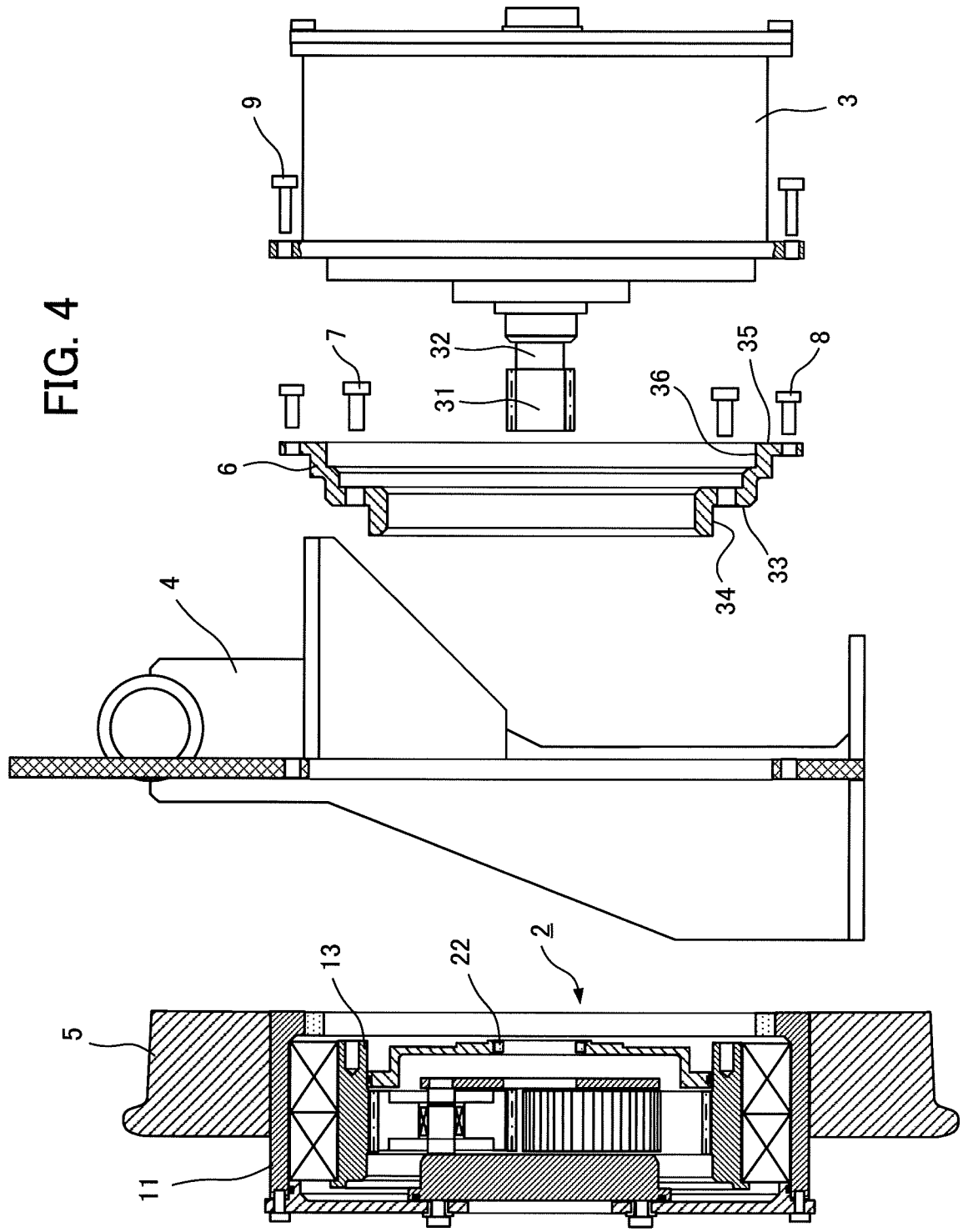
FIG. 4 is an exploded cross-sectional view of the independent wheel drive device according to Embodiment 1.

FIG. 4 is an exploded cross-sectional view of the independent wheel drive device according to Embodiment 1. As described above, the fixation ring 6 is fixed to the support frame 4 using bolts 8. The bearing inner cylinder 13 of the planetary gear device 2 is fixed to the fixation ring 6 using the bolt 7. The drive motor 3 is fixed to the support frame 4 using the bolt 9 on the opposite side of the planetary gear device 2. For example, the bolts 8 for fixing the fixation ring 6 are arranged at equal distances on the outer circumference of the fixation ring 6. The bolts 9 for fixing the drive motor 3 to the support frame 4 and the bolts 8 are alternately disposed, for example, on the outer circumference of the flange of the drive motor 3. A U-shaped cutout is formed in the flange portion of the drive motor 3 so as to avoid the bolts 8.

Since the drive motor 3 is fixed by the bolt 9, if the bolt 9 is loosened, the drive motor 3 can be dismounted from the support frame 4 and the planetary gear device 2 in a state in which the sun gear 31 is coupled to the rotation shaft 32. Even when the drive motor 3 is dismounted, since the planetary gear device 2 is fixed to the support frame 4, the vehicle body 131 of the vehicle 130 illustrated in FIG. 2 is kept in a state in which the vehicle body 131 is supported on the rails by the wheels 5. That is, the drive motor 3 can be dismounted or mounted in a state in which the vehicle 130 sits still on the rail.

The position of the planetary gear device 2 in the axial direction is defined by an abutment surface 33 of the fixation ring 6 on which the planetary gear device 2 is mounted. The position of the planetary gear device 2 in a direction orthogonal to the axis of the planetary gear device 2 is defined by an outer circumferential surface 34 of the fixation ring 6 on the small diameter side to which the bearing inner cylinder 13 is fitted. The position of the drive motor 3 in the axial direction is defined by an end surface 35 of the fixation ring 6 on the drive motor 3 side. A position of the drive motor 3 in a direction orthogonal to the axis of the drive motor 3 is defined by an inner circumferential surface 36 of the fixation ring 6 on the large diameter side. Since the relative positions of the planetary gear device 2 and the drive motor 3 are determined by the fixation ring 6, if the fixation ring 6 is accurately machined, assembling the planetary gear device 2 and the drive motor 3 by aligning axis centers thereof without tilting can be easily reproduced.

Figure 5:
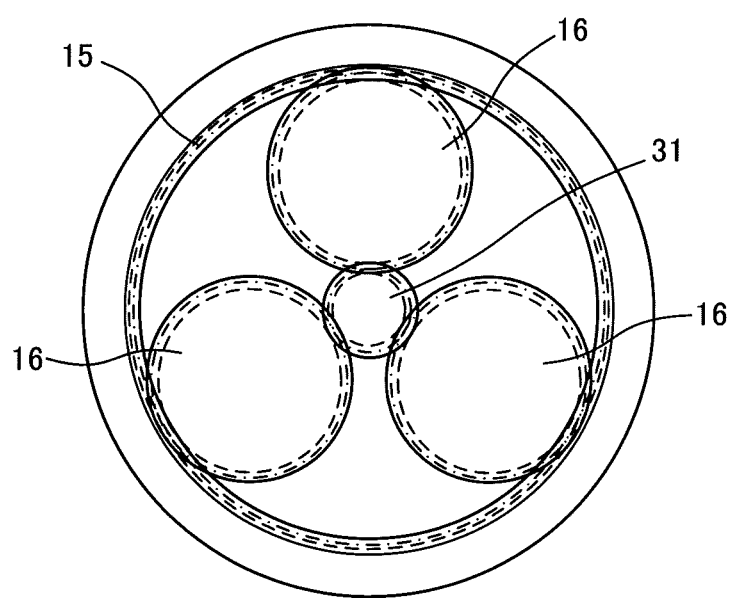
FIG. 5 is a diagram showing an arrangement of gears of a planetary gear device according to Embodiment 1.

FIG. 5 is a diagram showing an arrangement of the gears of the planetary gear device according to Embodiment 1. FIG. 5 shows a case where three units of the planetary gears 16 are provided. Depending on how the number of teeth of the gears is selected, two or four units of the planetary gear 16 are arrangeable. In principle, the number of the planetary gear 16 of the planetary gear device 2 may be one unit. Two or more units of the planetary gears 16 are preferably arranged at equal distances around the sun gear 31 in order to offset the forces applied in a direction orthogonal to the rotation shaft 32 of the drive motor 3 and the shaft of the planetary carrier 18.

Figure 6:
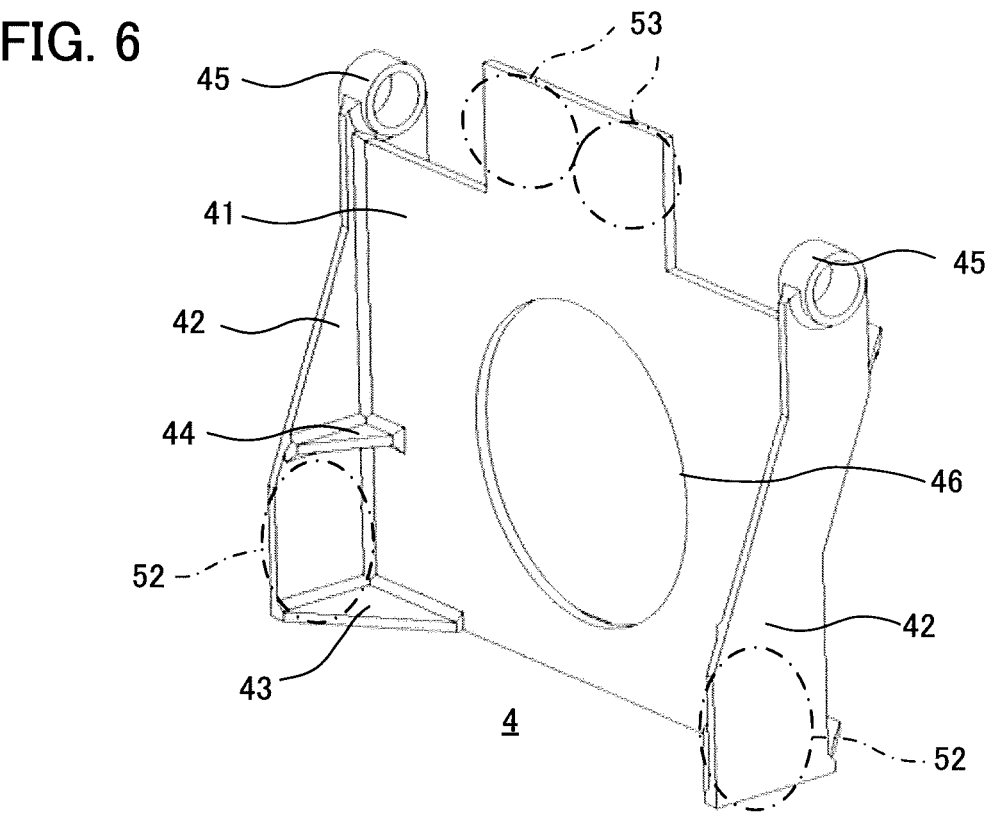
FIG. 6 is a perspective view of a support frame according to Embodiment 1 as viewed from the planetary gear device side.
Figure 7:
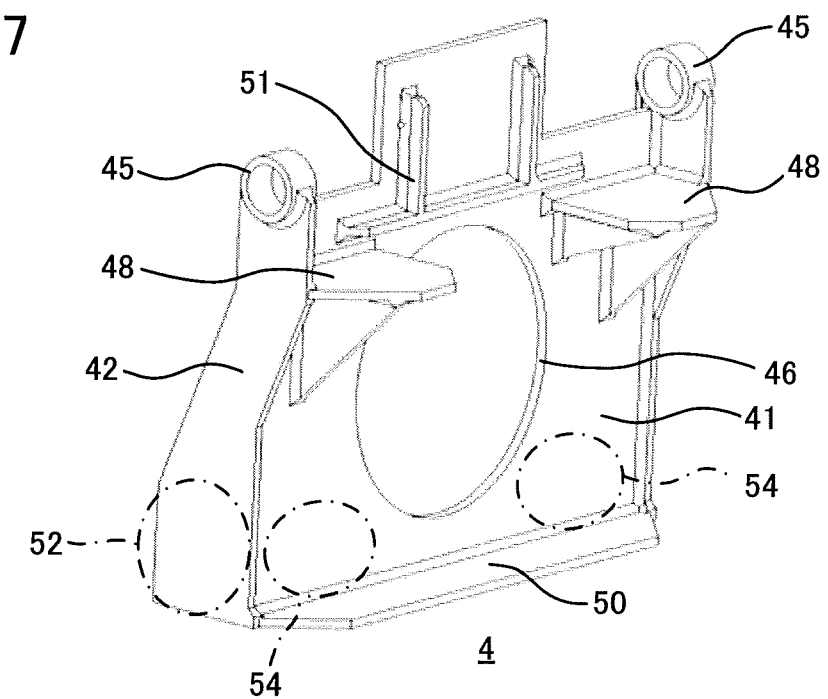
FIG. 7 is a perspective view of the support frame according to Embodiment 1 as viewed from the drive motor side.

FIG. 6 is a perspective view of the support frame according to Embodiment 1 as viewed from the planetary gear device side. FIG. 7 is a perspective view of the support frame according to Embodiment 1 as viewed from the drive motor side. A support frame main plate 41 and a support frame side plate 42 are integrally shaped to be the support frame 4. The support frame main plate 41 fixedly supports the planetary gear device 2 and the drive motor 3, and the support frame side plate 42 is fixed at right angles to both sides of the support frame main plate 41. The support frame main plate 41 and the support frame side plate 42 are formed in a letter H shape viewed in the vertical direction. A fitting hole 46 capable of positioning the fixation ring 6 is formed in the central portion of the support frame main plate 41. The fixation ring 6 shown in FIG. 4 is fitted in the fitting hole 46 and fixed to the support frame 4 by, for example, the bolts 8.

A lateral load acts on the support frame 4 in the axial direction from the wheel 5 during traveling. Thus, reinforcing plates 43 and 44 are fixed to the support frame 4 on the side of the wheel 5 and reinforcing plates 50 and 51 are fixed to the side of the drive motor 3. A mount 48 on which the suspension system 132 is mounted is fixed to the support frame 4 on the drive motor 3 side. The vehicle body 131 is supported via the suspension system 132 mounted on the mount 48. The suspension system 132 includes, for example, an air spring. The mounting and fixing of the air spring to the support frame 4 is performed, for example, by passing mount bolts through a hole arranged in the mount 48 and screwing from the lower side. For the suspension system 132, other than the air spring, for example, a laminated leaf spring or a combination of a coil spring and a damping device can be used.

The support frame 4 is supported at a total of four locations in an upper support portion 45 and a lower support portion 52 in the lateral direction of the vehicle 130, which is the axial direction of the planetary gear device 2. The support frame 4 is supported by an upper traction link support portion 53 and a lower traction link support portion 54 in the front-rear direction of the vehicle body. In addition, the upper traction link support portion 53 and the lower traction link support portion 54 of the support frame 4 are respectively arranged at two locations, either one of the two locations is used to provide support.

As compared with the independent wheel drive device 1 of Embodiment 1 configured as described above, the conventional independent wheel drive device includes the following. For example, in the case of Patent Literature 1, as shown in FIG. 2 of Patent Literature 1, the conventional independent wheel drive device of Patent Literature 1 includes an axle box (7) rotatably supported around a vertical direction axis with a main shaft (4) positioned at the center. A single wheel (5) is rotatably supported by the axle box (7). The gear device (10) is disposed on the side opposite to the main shaft (4) with respect to the single wheel (5), and a drive motor (9) is arranged inside the axle box (7). It is difficult to shorten the overall axial length of the axle box (7) in which the gear device (10) and the drive motor (9) with the single wheel (5) are stored. Since the vehicle body (3) is supported on the main shaft (4) via an air spring (6), it is difficult to configure the drive motor (9) to be capable of being dismounted from the axle box (7) in a state in which the vehicle body (3) is supported.

As described above, according to Embodiment 1, the planetary gear device 2 is disposed on the inner circumferential side of the wheel 5, and the planetary gear device 2, the wheel 5, and the drive motor 3 are disposed on both sides of the support frame 4 and fixed to the support frame 4. Thus, the length of the entire drive device including the wheel 5 can be shortened in the wheel rotation shaft direction.

Furthermore, advantageous effects of Embodiment 1 is as follows.

By fitting the drive motor 3 onto the inner surface of the fixation ring 6, aligning axes of the drive motor 3 and the planetary gear device 2 is easy. The drive motor 3 is fixed to the support frame 4 by fastening bolts. Thus, mounting and dismounting of the drive motor 3 required for maintaining the drive motor 3 can be easily performed.

Embodiment 2

Figure 8:
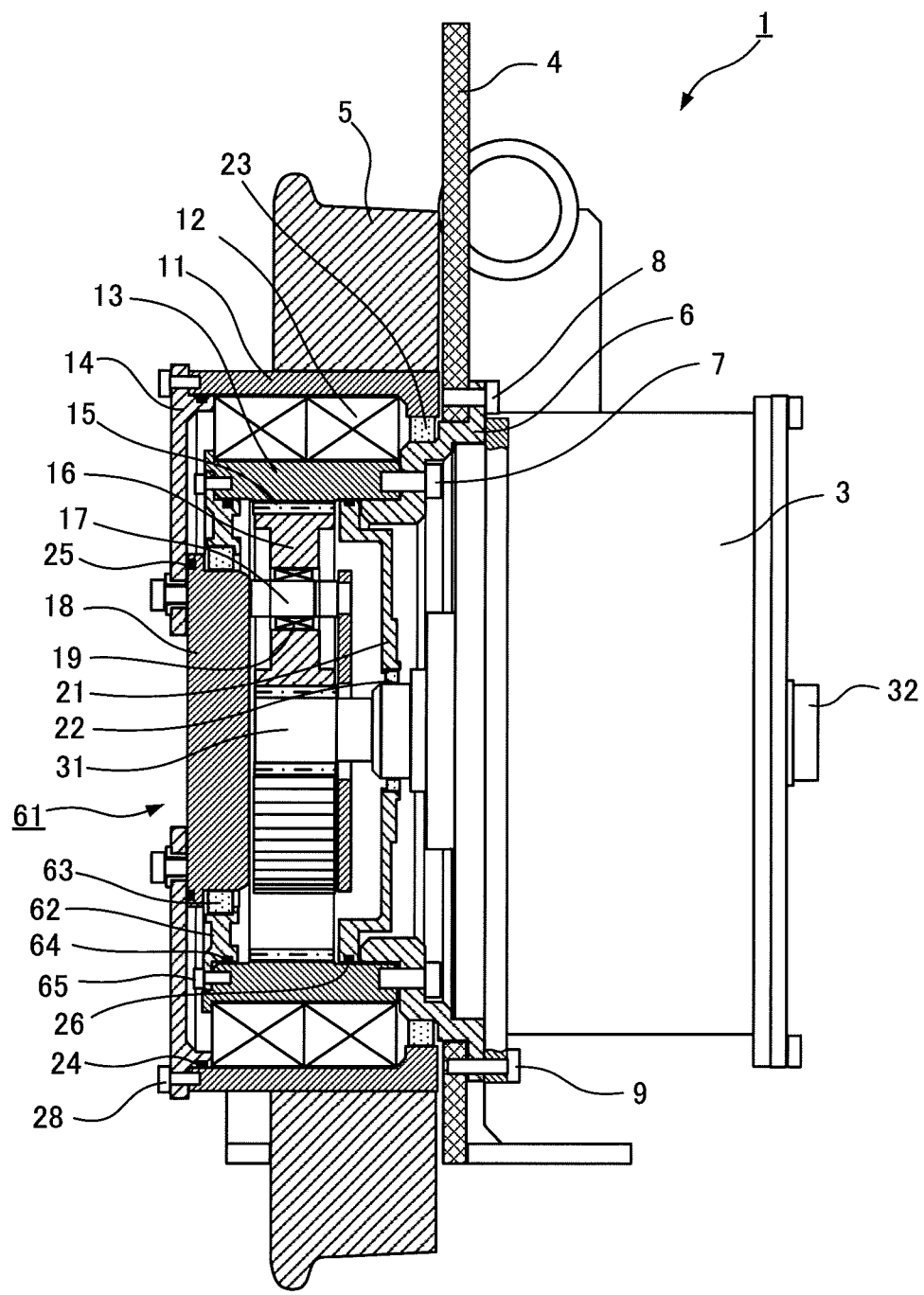
FIG. 8 is a cross-sectional view showing an internal configuration of an independent wheel drive device according to Embodiment 2 of the present disclosure.

FIG. 8 is a cross-sectional view showing an internal configuration of an independent wheel drive device according to Embodiment 2 of the present disclosure. An independent wheel drive device 1 according to Embodiment 2 includes a seal member between the inner circumference of the bearing inner cylinder 13 and the planetary carrier 18 on the output shaft end plate 14 side of a planetary gear device 61. The other configurations are the same as those of the independent wheel drive device 1 according to Embodiment 1.

In order to efficiently lubricate the inside of the planetary gear device 61, the independent wheel drive device 1 according to Embodiment 2 separates lubrication of the bearing 12 on the low speed side from lubrication of the bearing 19 that rotates and supports the planetary gear 16, and from lubrication of engagement of the internal gear 15, the planetary gear 16 and the sun gear 31 on the high speed side.

As shown in FIG. 8, an annular seal holding plate 62 is fixed to the bearing inner cylinder 13 on the output shaft end plate 14 side using a bolt 65. An O-ring 64 is interposed between the seal holding plate 62 and the bearing inner cylinder 13. Since a relative rotational movement occurs between the seal holding plate 62 and the planetary carrier 18, an oil seal 63 as a sealing member is disposed. The seal holding plate 62, the oil seal 63 and the O-ring 64 seal the space between the bearing inner cylinder 13 and the planetary carrier 18 on the side opposite to the support frame 4 of the planetary gear device 61.

In Embodiment 2, lubrication can be separately performed in the low-speed rotation region in which the bearing 12 is fitted and the high-speed rotation region in which the internal gear 15, the planetary gear 16 and the sun gear 31 engage with each other. Appropriate lubrication can be performed in each region by enclosing lubrication oil of an appropriate type and amount in each region. Advantageous effects can be expected such as reduced mixing of the lubrication oil in the low speed rotation region and in the high speed rotation region and reduced instances of excess or insufficient lubrication oil.

Embodiment 3

Figure 9:
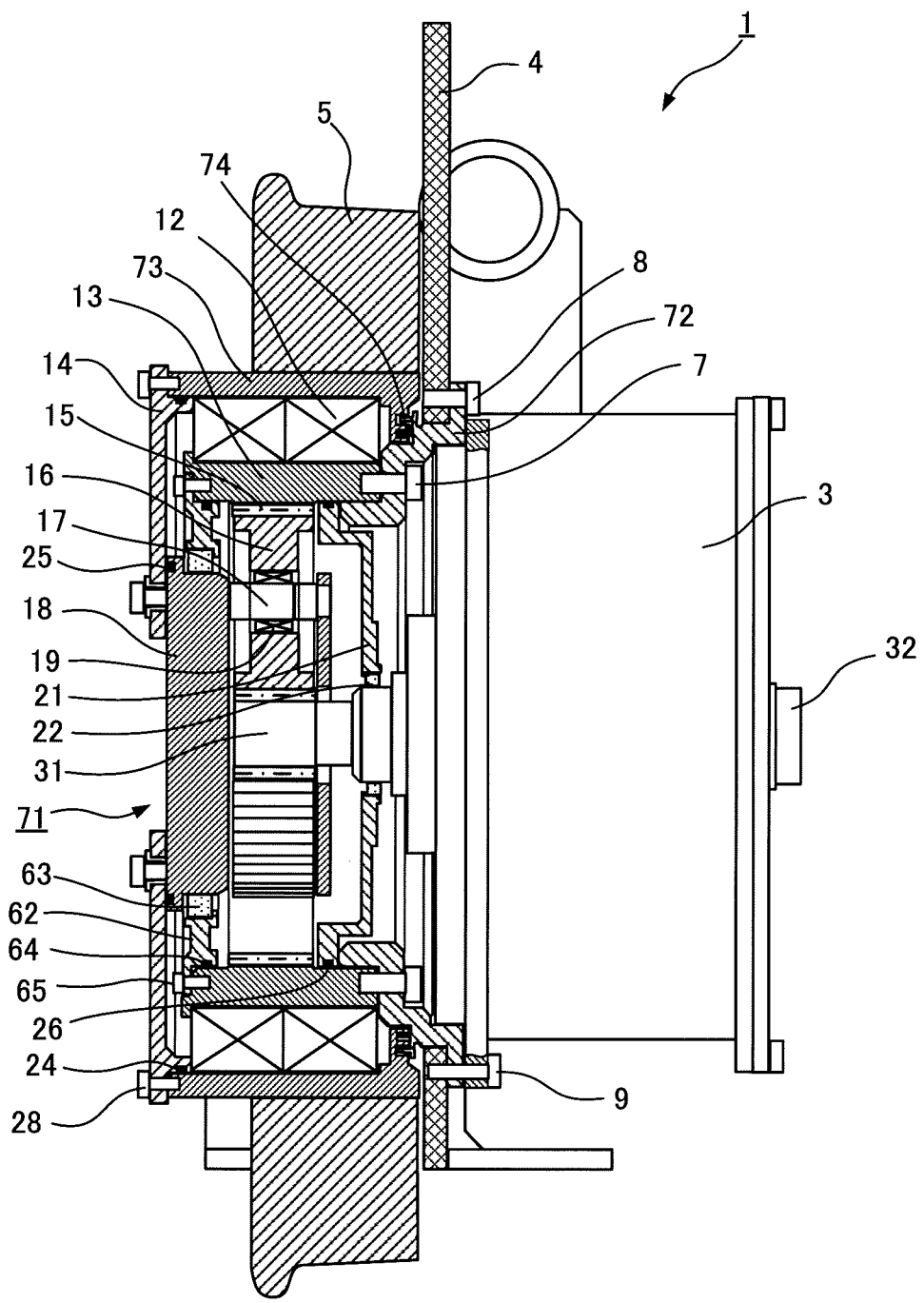
FIG. 9 is a cross-sectional view showing an internal configuration of an independent wheel drive device according to Embodiment 3 of the present disclosure.

FIG. 9 is a cross-sectional view showing an internal configuration of an independent wheel drive device according to Embodiment 3 of the present disclosure. An independent wheel drive device 1 according to Embodiment 3 includes a labyrinth seal 74 between an output shaft outer cylinder 73 and a fixation ring 72 on the side of the support frame 4 of the output shaft outer cylinder 73. Other configurations are the same as those of the independent wheel drive device 1 according to Embodiment 2.

As shown in FIG. 9, an annular groove is formed in a surface facing the fixation ring 72 on the support frame 4 side of the output shaft outer cylinder 73, and an annular groove in the fixation ring 72 is formed so that the annular ring of the output shaft outer cylinder 73, the concave and the convex portions are opposed and fitted to each other with a gap therebetween in the facing surface of the fixation ring 72. By fastening and fixing the bearing inner cylinder 13 to the fixation ring 72, the annular grooves of the output shaft outer cylinder 73 and the fixation ring 72 form the labyrinth seal 74.

In Embodiment 3, instead of the oil seal 23, the annular grooves provided in the output shaft outer cylinder 73 and the fixation ring 72 form the labyrinth seal 74 without contacting each other. Thus, frictional resistance due to contact of the oil seal 23 with the output shaft outer cylinder 73 (or the fixation ring 72) does not exist. As the result, the rotational energy loss and the temperature rise of a planetary gear device 71 can be reduced.

The bearing 12 rotatably supporting the output shaft outer cylinder 73 rotates at a comparatively low speed. Thus, lubrication can be performed using grease instead of using lubrication oil. When lubrication is performed using grease, the labyrinth seal 74 is more suitable than the oil seal 23 shown in Embodiments 1 and 2.

Embodiment 4

Figure 10:
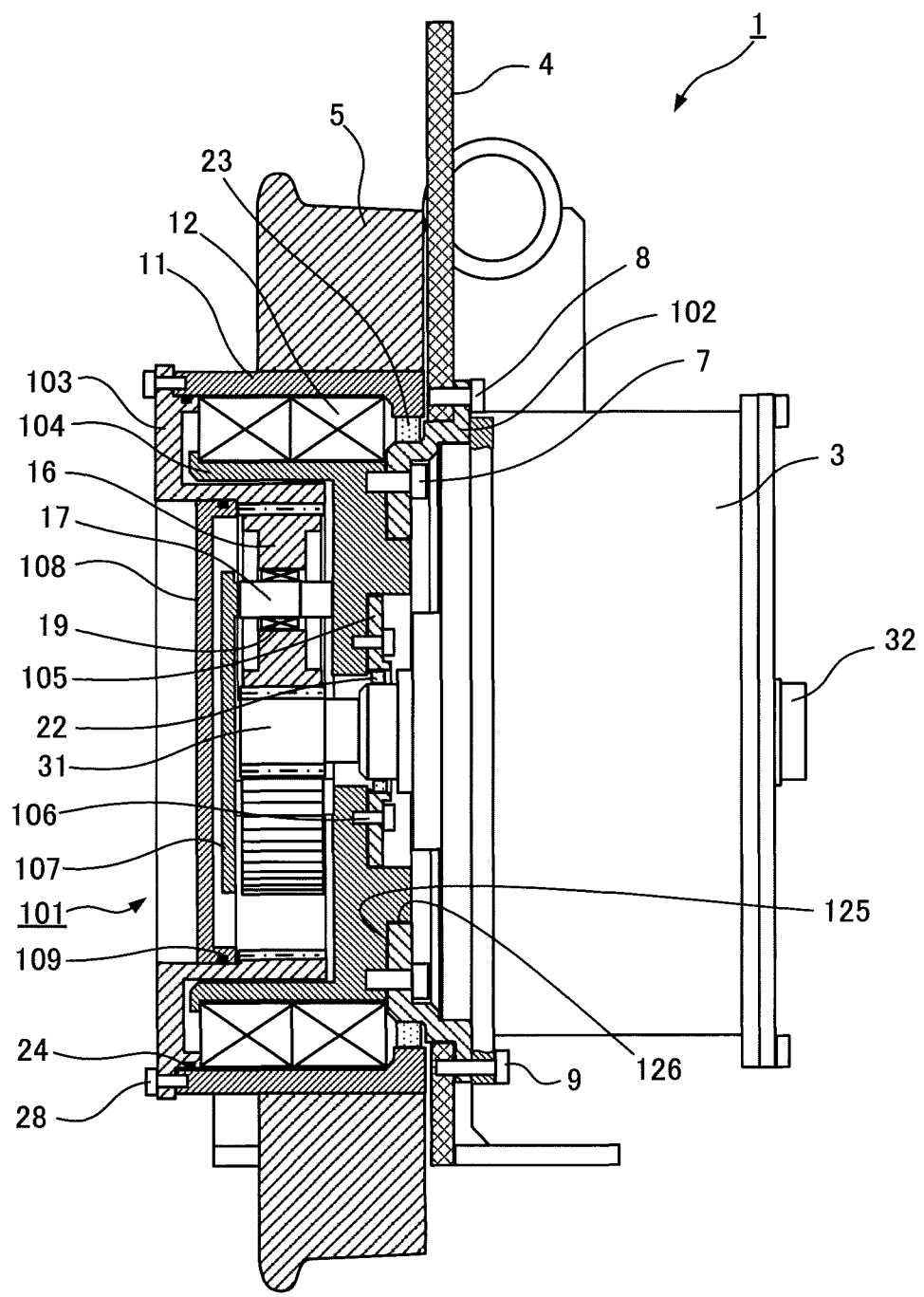
FIG. 10 is a cross-sectional view showing an internal configuration of an independent wheel drive device according to Embodiment 4 of the present disclosure.

FIG. 10 is a cross-sectional view showing an internal configuration of an independent wheel drive device according to Embodiment 4 of the present disclosure. In the independent wheel drive device 1 according to Embodiment 4, a bearing inner cylinder 104 serving also as a planetary carrier of a planetary gear device 101 is fixed to a fixation ring 102 using the bolt 7, and the fixation ring 102 is fixed to the support frame 4 using the bolts 8. The bearing 12 is fitted on the radial direction outer circumference of the bearing inner cylinder 104, and the output shaft outer cylinder 11 is fitted on the radial direction outer circumference of the bearing 12. In the bearing inner cylinder 104, an outer cylinder portion to which the bearing 12 is fitted is disposed away from an internal gear 103 on the radial direction outer circumferential side of the gear portion of the internal gear 103.

The internal gear 103 is fixed to the output shaft outer cylinder 11 using the bolts 28 with the gear portion on the side opposite to the support frame 4 extending in radially outer circumferential direction. An annular plate portion extending in the radially outer circumferential direction of the internal gear 103 fixes the internal gear portion to the output shaft outer cylinder 11 on the side opposite to the support frame 4 in the axial direction of the planetary gear device 101 and includes a transmission member that transmits the rotation of the internal gear portion to the output shaft outer cylinder 11. The planetary gear 16 is rotatably supported by the planetary gear shaft 17 via the bearing 19 in a state of engaging with the internal gear 103. One end of the planetary gear shaft 17 is fixed to the planetary carrier portion of the bearing inner cylinder 104, and the other end thereof is supported by a planetary shaft supporting disc 107. Since the bearing inner cylinder 104 also serving as the planetary carrier is fixed to the fixation ring 102, the planetary gear shaft 17 does not move with respect to the support frame 4.

In the independent wheel drive device 1 of Embodiment 4 shown in FIG. 10, the internal gear 15 of Embodiment 1 is separated from the bearing inner cylinder 13, the planetary shaft supporting disc 20 is replaced with the planetary carrier 18, and the planetary carrier 18 is fixed to the bearing inner cylinder 13 to be the bearing inner cylinder 104 on the side of the support frame 4 of the planetary gear device 2 and the separated internal gear portion can be regarded as being integrally formed with the annular plate portion which is the output shaft end plate on the opposite side of the support frame 4.

The drive motor 3 is fixed to the support frame 4 using bolts 9 on the opposite side of the planetary gear device 101. The rotation shaft 32 of the drive motor 3 is coupled to the sun gear 31 that engages with the planetary gear 16 of the planetary gear device 101. In Embodiment 4, since the position of the planetary gear shaft 17 does not change when the rotation shaft 32 of the drive motor 3 rotates and the sun gear 31 rotates, the planetary gear 16 rotates on its own axis not to revolve around the sun gear 31, acts as a so-called an idler gear, and the internal gear 103 rotates. The internal gear 103 rotates in a direction opposite to the rotation of the rotation shaft 32 of the drive motor 3. Since the annular plate portion extending in the radially outer circumferential direction is fixed to the output shaft outer cylinder 11, the rotation of the internal gear 103 is transmitted to the output shaft outer cylinder 11, and the wheel 5, that is fitted on the output shaft outer cylinder 11 in a relative rotation preventing manner, rotates.

Similar to Embodiment 1, various seal members are used for the part fastening portion in order to prevent the lubrication oil lubricated inside the planetary gear device 101 and the bearing 12 from leaking to the outside. On the support frame 4 side of the planetary gear device 101, a seal holding plate 105 is fixed to the planetary carrier portion of the bearing inner cylinder 104 using bolts 106. The oil seal 22 is provided between the seal holding plate 105 and the rotation shaft 32, since the seal holding plate 105 and the rotation shaft 32 rotate relative to each other.

Since the annular plate portions of the output shaft outer cylinder 11 and the internal gear 103 are fastened by the bolts 28, the O-ring 24 is used on the opposite side of the support frame 4 of the planetary gear device 101. In order to seal the inner circumferential side of the internal gear 103, a seal disc 108 is fitted in the inner circumference of the internal gear 103 while being spaced apart from the planetary shaft supporting disc 107. An O-ring 109 is disposed between the outer circumferential surface of the seal disc 108 and the inner circumferential surface of the internal gear 103.

In Embodiment 4, the bearing inner cylinder 104 of the planetary gear device 101 is fixed to the fixation ring 102 using the bolt 7. The axial direction position of the planetary gear device 101 is defined by an abutment surface 125 on which the planetary gear device 101 of the fixation ring 102 is mounted. The position in the direction orthogonal to the axis of the planetary gear device 101 is defined by an inner circumferential surface 126 on the small diameter side of the fixation ring 102 to which the bearing inner cylinder 104 is fitted. Fixing and positioning of the drive motor 3 are similar as those in Embodiment 1. Also in Embodiment 4, since the relative positions of the planetary gear device 101 and the drive motor 3 are determined by the fixation ring 102, if the fixation ring 102 is accurately machined, assembling the planetary gear device 101 and the drive motor 3 by aligning axis centers thereof without tilting can be easily reproduced.

As described above, according to Embodiment 4, the planetary gear device 101 is disposed on the inner circumferential side of the wheel 5, and the planetary gear device 101, the wheel 5, and the drive motor 3 are disposed on both sides of the support frame 4 to fix to the support frame 4. Thus, the length of the entire drive device including the wheel 5 in the wheel rotation shaft direction can be shortened.

Embodiment 5

Figure 11:
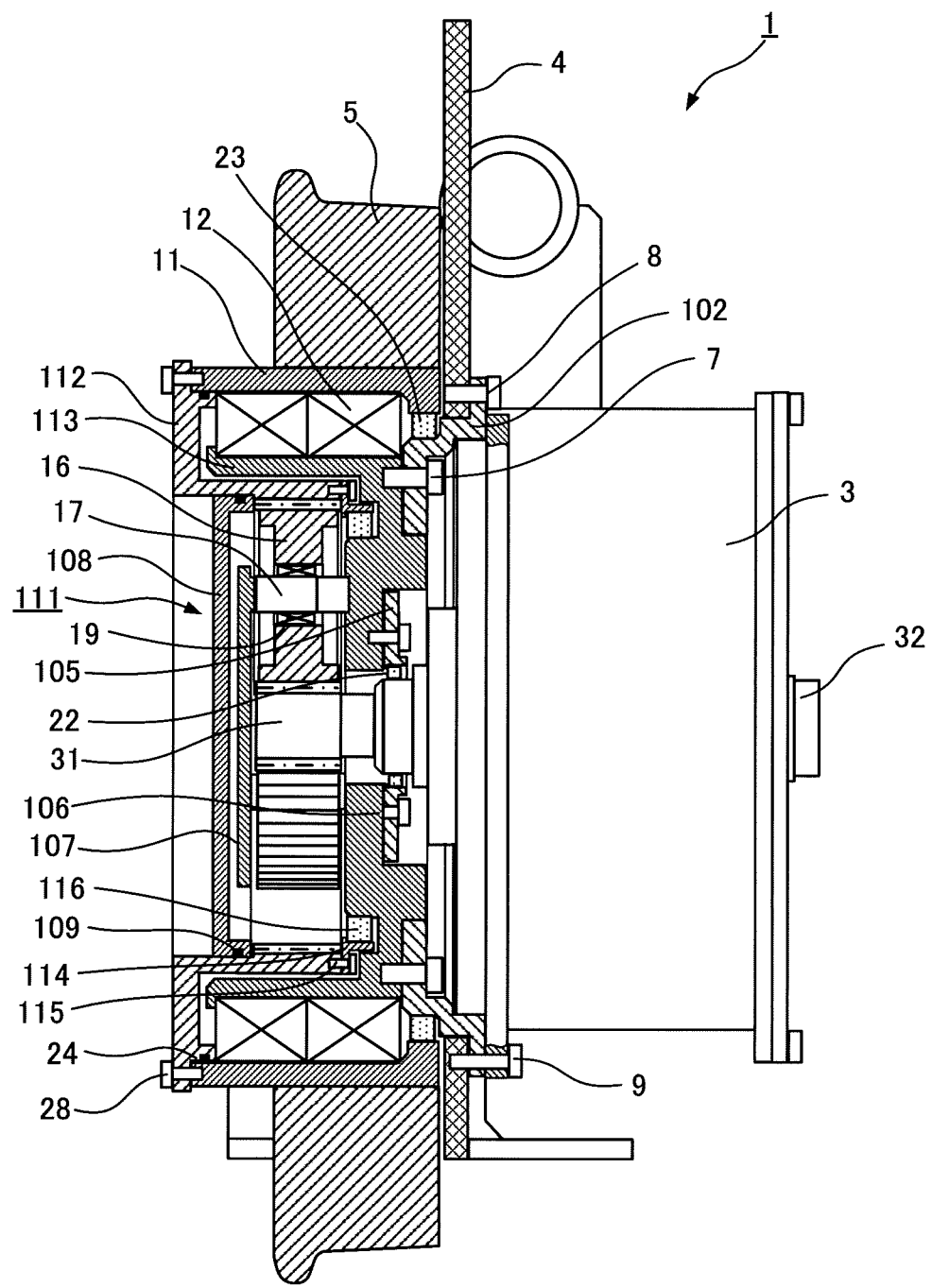
FIG. 11 is a cross-sectional view showing an internal configuration of an independent wheel drive device according to Embodiment 5 of the present disclosure.

FIG. 11 is a cross-sectional view showing an internal configuration of an independent wheel drive device according to Embodiment 5 of the present disclosure. An independent wheel drive device 1 according to Embodiment 5 is provided with a seal member 116 between an internal gear 112 of a planetary gear device 111 and the planetary carrier portion of a bearing inner cylinder 113. Other configurations are the same as those of the independent wheel drive device 1 according to Embodiment 4.

In order to efficiently lubricate the inside of the planetary gear device 111, the independent wheel drive device 1 according to Embodiment 5 separates lubrication of the bearing 12 on the low speed side from lubrication of the bearing 19 that rotates and supports the planetary gear 16, and from lubrication of engagement of the internal gear 112, the planetary gear 16 and the sun gear 31 on the high speed planetary gear side.

As shown in FIG. 11, a seal ring 114 is fastened and fixed to an end surface of the internal gear 112 on the support frame 4 side using bolts 115, and the oil seal 116 is fitted in the seal ring 114 on the inner diameter side. An annular groove is formed in the bearing inner cylinder 113 on the larger diameter side from the fixed portion of the planetary gear shaft 17, and the annular groove and the oil seal 116 are included in a seal structure.

In Embodiment 5, lubrication can be performed by separating lubrication of the low-speed rotation region in which the bearing 12 is fitted from lubrication of the high-speed rotation region in which the internal gear 112, the planetary gear 16 and the sun gear 31 are engaged with each other. Appropriate lubrication can be performed in each region by enclosing lubrication oil of an appropriate type and amount in each region. Advantageous effects can be expected such as reduced mixing of the lubrication oil in the low speed rotation region and in the high speed rotation region and reduced instances of excess or insufficient lubrication oil.

Embodiment 6

Figure 12:
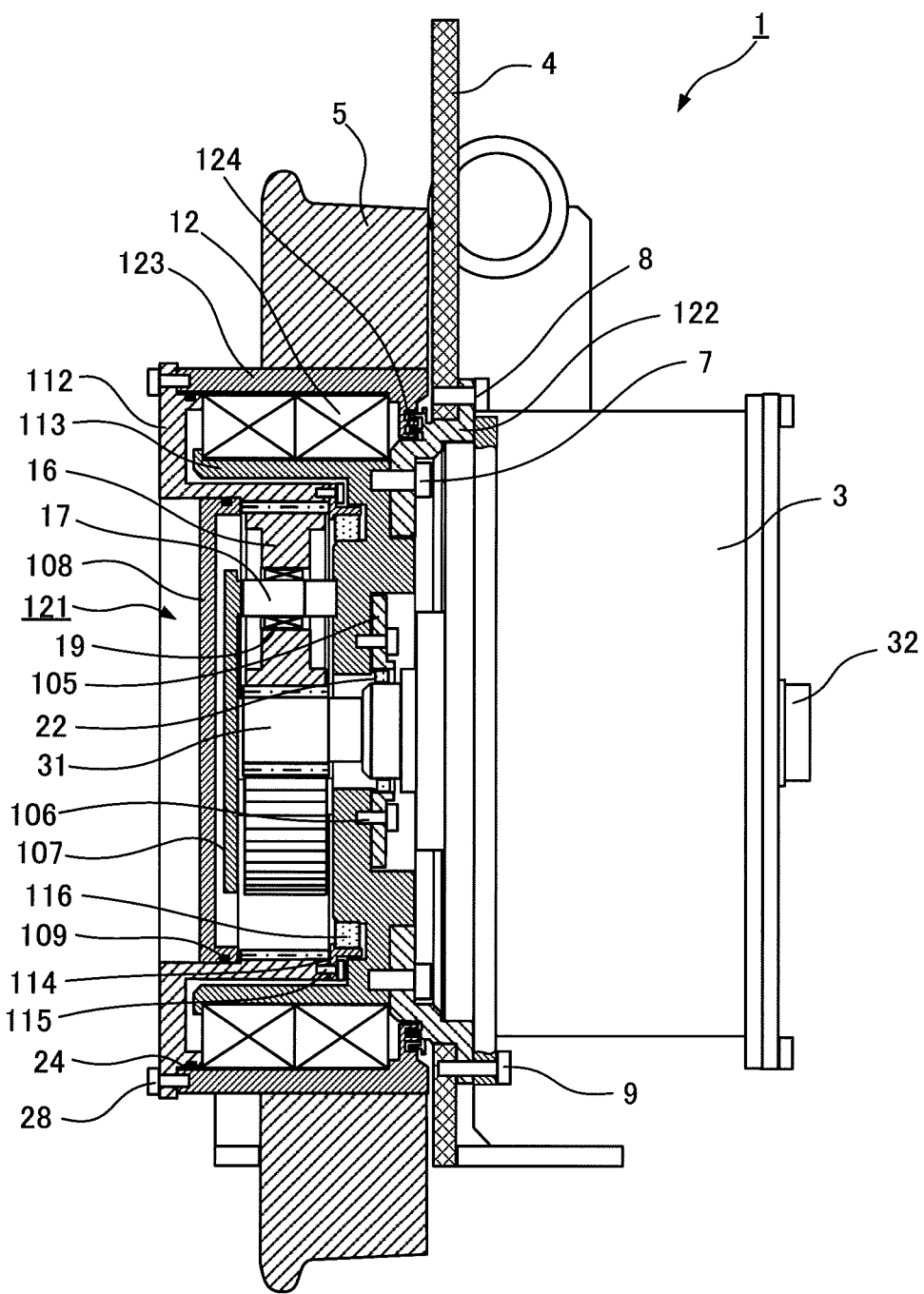
FIG. 12 is a cross-sectional view showing an internal configuration of an independent wheel drive device according to Embodiment 6 of the present disclosure.

FIG. 12 is a cross-sectional view showing an internal configuration of an independent wheel drive device according to Embodiment 6 of the present disclosure. In the independent wheel drive device 1 according to Embodiment 6, a labyrinth seal 124 is formed between an output shaft outer cylinder 123 and a fixation ring 122 on the support frame 4 side of the output shaft outer cylinder 123. The rest of the configuration is the same as those of the independent wheel drive device 1 according to Embodiment 5.

As shown in FIG. 12, an annular groove is formed in the surface of the output shaft outer cylinder 123 facing the fixation ring 122 on the support frame 4 side, and an annular groove is formed in the facing surface of the fixation ring 122 opposed to the annular groove of the output shaft outer cylinder 123. The concave and the convex portions formed by the grooves of the fixation ring 122 and the output shaft outer cylinder 123 respectively are opposed and fitted to each other with a gap therebetween. By fastening and fixing the bearing inner cylinder 113 to the fixation ring 122, the annular groove of the output shaft outer cylinder 123 and the fixation ring 122 constitute the labyrinth seal 124.

In Embodiment 6, instead of the oil seal 23, annular grooves provided in the output shaft outer cylinder 123 and the fixation ring 122 form the labyrinth seal 124 without contacting each other. Thus, frictional resistance due to contact of the oil seal 23 with the output shaft outer cylinder 123 (or the fixation ring 122) does not exist. As the result, the rotational energy loss and the temperature rise of the planetary gear device 121 can be reduced.

The bearing 12 rotatably supporting the output shaft outer cylinder 123 rotates at a comparatively low speed. Thus, lubrication can be performed using grease instead of using lubrication oil. When lubrication is performed using grease, the labyrinth seal 124 is more suitable than the oil seal 23 shown in Embodiments 4 and 5.

Any of the independent wheel drive devices 1 according to the above-mentioned embodiments can be used for the vehicle 130 as shown in FIG. 2. The independent wheel drive device 1 according to Embodiment of the present disclosure is suitable to be adopted as a driving device for a driving wheel for a low floor vehicle.

The bearing 12 that rotatably supports the output shaft outer cylinders 11, 73, and 123 is not limited to a combination of a cylindrical roller bearing mainly supporting a radial load and a deep groove ball bearing that can support an axial load. Bearings that can support an axial load, such as tapered roller bearings, flanged cylindrical roller bearings, and/or the like may be used.

Regarding seals for preventing leakage of the lubrication oil inside the planetary gear device to the outside, the fastening portion without relative movement is not limited to the use of the O-ring. Other sealing members capable of preventing leakage such as a gasket, a liquid packing, or the like may be used. Also, the seal for the movable parts with relative movement is not limited to the use of an oil seal. Other slidable sealing members that can prevent leakage may be used.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Independent wheel drive device
2 Planetary gear device
3 Drive motor
4 Support frame
5 Wheel
6 Fixation ring
7 Bolt
8 Bolt
9 Bolt
11 Output shaft outer cylinder
12 Bearing
13 Bearing inner cylinder
14 Output shaft end plate
15 Internal gear
16 Planetary gear
17 Planetary gear shaft
18 Planetary carrier
19 Bearing
20 Planetary shaft supporting disc
21 Seal disc
22 Oil seal
23 Oil seal
24 O-ring
25 O-ring
26 O-ring
27 Torque transmission ring
28 Bolt
29 Bolt
31 Sun gear
32 Rotation shaft
33 Abutment surface
34 Outer circumferential surface
35 End surface
36 Inner circumferential surface
41 Support frame main plate
42 Support frame side plate
43 Reinforcing plate
44 Reinforcing plate
45 Upper support portion
46 Fitting hole
48 Mount
50 Reinforcing plate
51 Reinforcing plate
52 Lower support portion
53 Upper traction link support portion
54 Lower traction link support portion 61 Planetary gear device
62 Seal holding plate
63 Oil seal
64 O-ring
65 Bolt
71 Planetary gear device
72 Fixation ring
73 Output shaft outer cylinder
74 Labyrinth seal
101 Planetary gear device
102 Fixation ring
103 Internal gear
104 Bearing inner cylinder
105 Seal holding plate
106 Bolt
107 Planetary shaft supporting disc
108 Seal disc
109 O-ring
111 Planetary gear device
112 Internal gear
113 Bearing inner cylinder
114 Seal ring
115 Bolt
116 Oil seal
121 Planetary gear device
122 Fixation ring
123 Output shaft outer cylinder
124 Labyrinth seal
125 Abutment surface
126 Inner circumferential surface
130 Vehicle
131 Vehicle body
132 Suspension system
133 Frame

The invention claimed is:

1. An independent wheel drive device comprising:
a planetary gear device that has an input shaft arranged on one side and an output shaft disposed on another side and reduces a rotation speed of the input shaft to transmit a rotation to the output shaft;
a wheel fitted in an outer circumference of an output shaft outer cylinder that includes a radial direction outermost circumference of the planetary gear device in a relative rotation preventing manner;
a support frame fixedly supporting the input shaft side end in the axial direction of a bearing inner cylinder on the input shaft side of the planetary gear device and to support a vehicle body via a suspension system;
a drive motor dismountably fixed to the support frame on the side opposite to the bearing inner cylinder of the support frame and to rotate the input shaft; and
a seal member between the planetary carrier and the bearing inner cylinder on the side of the planetary gear device opposite to the support frame.

2. The independent wheel drive device according to claim 1, wherein the planetary gear device comprises:
an internal gear,
a planetary gear engaging with the internal gear,
a sun gear positioned at the center of the internal gear and engaging with the planetary gear,
a planetary carrier rotatably supporting the planetary gear in a state in which the planetary gear engages with the internal gear and the sun gear,
the bearing inner cylinder, the bearing inner cylinder containing the internal gear on an inner circumferential side of the bearing inner cylinder,
a bearing coaxially fitting onto the outer circumference of the bearing inner cylinder,
the output shaft outer cylinder, the output shaft outer cylinder coaxially fitting on the outer circumference of the bearing, and
an output shaft end plate to transmit a rotation of the planetary carrier to the output shaft outer cylinder,
wherein the sun gear is the input shaft and the output shaft outer cylinder is the output shaft.

3. The independent wheel drive device according to claim 2, wherein the bearing is lubricated with grease.

4. A vehicle comprising, the independent wheel drive device according to claim 1, wherein the wheel is driven by the independent wheel drive device.

5. An independent wheel drive device comprising:
a planetary gear device that has an input shaft arranged on one side and an output shaft disposed on another side and reduces a rotation speed of the input shaft to transmit a rotation to the output shaft;
a wheel fitted in an outer circumference of an output shaft outer cylinder that includes a radial direction outermost circumference of the planetary gear device in a relative rotation preventing manner;
a support frame fixedly supporting the input shaft side end in the axial direction of a bearing inner cylinder on the input shaft side of the planetary gear device and to support a vehicle body via a suspension system;
a drive motor fixed to the support frame on the side opposite to the bearing inner cylinder of the support frame and to rotate the input shaft;
a fixation ring interposed between the bearing inner cylinder and the support frame, the fixation ring fixing the bearing inner cylinder to the support frame, and abutting the drive motor forming a surface defining the position of the drive motor, wherein the rotation shaft of the drive motor is inserted in the fixation ring; and
a seal member between the planetary carrier and the bearing inner cylinder on the side of the planetary gear device opposite to the support frame.

6. The independent wheel drive device according to claim 5, wherein the planetary gear device comprises:
an internal gear,
a planetary gear engaging with the internal gear,
a sun gear positioned at the center of the internal gear and engaging with the planetary gear,
a planetary carrier rotatably supporting the planetary gear in a state in which the planetary gear engages with the internal gear and the sun gear,
the bearing inner cylinder containing the internal gear on an inner circumferential side of the bearing inner cylinder,
a bearing coaxially fitting onto the outer circumference of the bearing inner cylinder,
the output shaft outer cylinder coaxially fitting on the outer circumference of the bearing, and
an output shaft end plate to transmit a rotation of the planetary carrier to the output shaft outer cylinder,
wherein the sun gear is the input shaft and the output shaft outer cylinder is the output shaft.

7. The independent wheel drive device according to claim 6, wherein the bearing is lubricated with grease.

8. The independent wheel drive device according to claim 5, further comprising an oil seal disposed between the output shaft outer cylinder and the fixation ring.

9. The independent wheel drive device according to claim 5, wherein a first annular groove is formed in a surface facing the fixation ring on the support frame side of the output shaft outer cylinder, and a second annular groove is formed in a surface facing the first annular groove on the fixation ring, and wherein the first annular groove and the second annular groove form a labyrinth seal.

10. The independent wheel drive device according to claim 5, wherein the support frame includes a support frame main plate being adapted to fixedly support the planetary gear device and the drive motor, and wherein a fitting hole is formed on the support frame main plate, the fitting hole being capable of positioning the fixation ring.

11. A vehicle comprising, the independent wheel drive device according to claim 5, wherein the wheel is driven by the independent wheel drive device.

12. An independent wheel drive device comprising:
a planetary gear device comprising:
  an internal gear,
  a planetary gear engaging with the internal gear,
  a sun gear positioned at the center of the internal gear and engaging with the planetary gear,
  a planetary carrier rotatably supporting the planetary gear in a state in which the planetary gear engages with the internal gear and the sun gear,
  a bearing inner cylinder containing the internal gear on an inner circumferential side of the bearing inner cylinder,
  a bearing coaxially fitting onto the outer circumference of the bearing inner cylinder,
  an output shaft outer cylinder coaxially fitting on the outer circumference of the bearing, and
  an output shaft end plate to transmit a rotation of the planetary carrier to the output shaft outer cylinder,
  wherein the sun gear is an input shaft and the output shaft outer cylinder is an output shaft;
a wheel fitted onto the outer circumference of the output shaft outer cylinder so as to prevent relative rotation;
a support frame fixedly supporting an axial direction end portion of the bearing inner cylinder on an axial direction side of the planetary gear device, and to support a vehicle body via a suspension system;
a drive motor fixed to the support frame coaxially with the planetary gear device, the rotation shaft of the drive motor coupled to the sun gear, on the side of the support frame opposite to the bearing inner cylinder, and
a seal member between the planetary carrier and the bearing inner cylinder on the side of the planetary gear device opposite to the support frame.

* * * * *